US012319840B2

(12) United States Patent
Patel et al.

(10) Patent No.: US 12,319,840 B2
(45) Date of Patent: Jun. 3, 2025

(54) CLEAR COATING COMPOSITIONS

(71) Applicant: IMERTECH SAS, Paris (FR)

(72) Inventors: Navin Patel, Lompoc, CA (US); Ben Newman, Derbyshire (GB); Agnes Fiolet, Toulouse (FR); Emmanuel Bertin, Tournefeuille (FR); Jacob Misuraca, Atlanta, GA (US)

(73) Assignee: IMERTECH SAS, Paris (FR)

( * ) Notice: Subject to any disclaimer, the term of this patent is extended or adjusted under 35 U.S.C. 154(b) by 664 days.

(21) Appl. No.: 16/761,984

(22) PCT Filed: Nov. 6, 2018

(86) PCT No.: PCT/EP2018/080248
§ 371 (c)(1),
(2) Date: May 6, 2020

(87) PCT Pub. No.: WO2019/086691
PCT Pub. Date: May 9, 2019

(65) Prior Publication Data
US 2020/0354590 A1    Nov. 12, 2020

(30) Foreign Application Priority Data

Nov. 6, 2017 (EP) ................................. 17200178

(51) Int. Cl.
*C09D 7/61* (2018.01)
*C08K 7/20* (2006.01)
*C08L 33/08* (2006.01)

(52) U.S. Cl.
CPC .............. *C09D 7/61* (2018.01); *C08K 7/20* (2013.01); *C08L 33/08* (2013.01); *C08K 2201/003* (2013.01); *C08K 2201/006* (2013.01); *C08L 2201/10* (2013.01); *C08L 2201/54* (2013.01)

(58) Field of Classification Search
CPC .............................. C09D 7/61; C08L 2201/10
See application file for complete search history.

(56) References Cited

U.S. PATENT DOCUMENTS

| 3,949,124 | A | * | 4/1976 | Jilla | D06M 13/152 |
| | | | | | 428/394 |
| 5,891,473 | A | * | 4/1999 | Stanier | A61K 9/1611 |
| | | | | | 424/435 |
| 6,258,412 | B1 | | 7/2001 | Ewing | |
| 8,172,938 | B2 | * | 5/2012 | Alright | C04B 26/02 |
| | | | | | 106/676 |
| 2006/0075930 | A1 | | 4/2006 | Wang et al. | |
| 2012/0141778 | A1 | | 6/2012 | Phipps | |
| 2013/0164499 | A1 | | 6/2013 | Haines | |
| 2017/0306164 | A1 | * | 10/2017 | Jo | C08K 5/01 |
| 2018/0230324 | A1 | * | 8/2018 | Lensbouer | C09D 133/08 |

FOREIGN PATENT DOCUMENTS

| CN | 1468147 A | 1/2004 |
| CN | 101400620 A | 4/2009 |
| CN | 103788792 A | 5/2014 |
| CN | 105670362 A | 6/2016 |
| CN | 106590262 A | 4/2017 |
| CN | 106634121 A | 5/2017 |
| EP | 1526150 A1 | 4/2005 |
| EP | 2 444 460 A1 | 4/2012 |
| GB | 2385856 A | 9/2003 |
| JP | 7-173413 | 7/1995 |
| JP | 1995173413 | 1/1997 |
| JP | 2007-169310 A | 7/2007 |
| WO | WO-0-05314 A1 | 2/2000 |
| WO | WO-2017-182336 A1 | 10/2017 |

OTHER PUBLICATIONS

Search Report for Application No. 201880069522.3, dated Dec. 14, 2021.
International Search Report and Written Opinion issued Feb. 19, 2019, in International Application No. PCT/EP2018/080248 (14 pgs.).
Sakka et al., "Whiteness of Fine Hollow Microspheres Prepared from Vitric Volcanic Materials," Journal of the Ceramic Society of Japan, 108(1):108-111 (2000).

* cited by examiner

*Primary Examiner* — Vickey Nerangis
(74) *Attorney, Agent, or Firm* — Finnegan, Henderson, Farabow, Garrett & Dunner, LLP

(57) ABSTRACT

The present invention relates to a clear coating composition comprising a perlite, wherein the median particle size, $d_{50}$, of the perlite is in the range of 0.5 and 25 μm, a method of making clear coating compositions and their use in coating an article or substrate.

12 Claims, No Drawings

CLEAR COATING COMPOSITIONS

CLAIM FOR PRIORITY

This application is a U.S. national phase entry under 35 U.S.C. § 371 from PCT International Application No. PCT/EP2018/080248, filed Nov. 6, 2018, which claims the benefit of priority of European Application No. 17200178.6, filed Nov. 6, 2017, from both of which this application claims priority and both of which are incorporated herein by reference.

FIELD OF THE INVENTION

The present invention relates to clear coating compositions and methods for making said compositions. This invention also relates to the use of the clear coating compositions for coating articles, said coated articles and films formed from the clear coating compositions.

BACKGROUND OF THE INVENTION

Many types of protective coatings are routinely applied to industrial and consumer goods and materials. Examples include oil coatings for metals, wood coatings for furniture, flooring and joinery and highly transparent glossy topcoats for automobiles. Such coatings are used to protect the underlying substrate from damage caused by impacts, scratching, moisture, light and other environmental factors to which the surface is exposed. The coatings are hard in order to resist scratching and impact damage and they commonly consist of highly crosslinked thermoset polymers. Traditionally, hardness is achieved by using a polymer possessing a stiff polymer chain and a high degree of cross-linking. However, the incorporation of this type of polymer may lead to coatings which are brittle and prone to cracking and flaking. Recent interest has focussed on the incorporation of inorganic particles possessing a median diameter of less than about 50 nm in order to improve the scratch and abrasion resistance of coatings. It is generally considered that such particles need to possess median diameters of 100 nm or less in order to impart the required properties and retain acceptable levels of transparency.

Mineral fillers are frequently added to opaque and pigmented coatings but not to transparent protective coatings. In opaque and pigmented coatings, their role is to increase the opacifying efficiency of $TiO_2$ pigment particles by spacing them out, and, in some cases, to help opacify the coating by generating light scattering of their own.

There is a continued need for clear coatings, which may also be referred to as clear film forming compositions, which possess good mechanical properties. However, in providing acceptable, or preferably improved, mechanical properties the optical properties such as the degree of transparency should not be compromised to a significant degree such, for example, that the composition is not substantially transparent. There is a need to provide clear coating compositions with both good mechanical properties and good transparency. It is therefore desirable to provide an alternative or improved clear coating compositions. It is also desirable to provide cost effective clear coating compositions with good mechanical and optical properties.

SUMMARY OF THE INVENTION

The present invention is defined in the appended claims.

In accordance with a first aspect, there is provided a clear coating composition comprising a perlite, wherein the median particle size, $d_{50}$, of the perlite is in the range of 0.5 and 25 µm as measured by sedimentation using a Sedigraph or laser diffraction.

In accordance with a second aspect, there is provided a method of making clear coating composition according to the first aspect comprising blending the perlite and other components of the clear coating composition.

In accordance with a third aspect, there is provided the use of a clear coating composition according to the first aspect for coating an article or substrate.

In accordance with a fourth aspect, there is provided a method for coating an article or substrate comprising coating said article or substrate with the clear coating composition according to the first aspect.

In accordance with a fourth aspect, there is provided an article or substrate coated with a clear coating composition according to the first aspect.

Certain embodiments of the present invention may provide one or more of the following advantages:
  desired hardness;
  desired abrasion resistance;
  desired blocking resistance;
  desired transparency;
  desired gloss level;
  desired stain resistance;
  desired amount of binder used.

The details, examples and preferences provided in relation to any particular one or more of the stated aspects of the present invention apply equally to all aspects of the present invention. Any combination of the embodiments, examples and preferences described herein in all possible variations thereof is encompassed by the present invention unless otherwise indicated herein, or otherwise clearly contradicted by context.

DETAILED DESCRIPTION

The clear coating compositions of the present invention may include lacquers, varnishes, paints and other products and will typically be suitable for application by spraying and/or brushing. During and/or after coating, the composition may be cured by evaporation of the solvent or it may be UV cured. Curing may also be achieved by the composition coming onto contact with moisture. The composition may comprise part of a so-called single component system or a so-called two component system (sometimes referred to as a 2K system). A suitable example of a so-called 2K system is a 2K polyurethane systems which typically comprises a polyol resin and an isocyanate crosslinker. The polyol is typically a relatively low molecular weight polymer which contains many OH groups. The isocyanate is a molecule containing two or more NCO groups which react with the OH groups on the polyol to make urethane linkages. A single component system, for example a 1K polyurethane system, comprises a blocked isocyanate in which the NCO groups are reacted with a blocking agent which prevents the reaction with the polyol. Application of heat decomposes the blocking agent to liberate the free NCO which is then free to react.

The clear coating composition may be aqueous based or non-aqueous based. For example, the clear coating composition may comprise a suitable non-aqueous solvent or reactive diluent. A reactive diluent participates in the curing process and forms a part of the resultant coating.

The clear coating composition, in addition to the perlite, may comprise a polymer precursor such as a resin, e.g. a polymer resin or an oligomer resin. The polymer precursor may be a self-crosslinking multi-phase acrylic dispersion, for example the Alberdingk® AC range, for example Alberdingk® AC 25381; fine disperse polymer dispersion; self-crosslinking aliphatic copolymer dispersion based on a polyester, polyurethane and polyacrylate; or a urethane acrylate, for example the Desmolux® range of aliphatic urethane acrylates, for example Desmolux® U100 or Desmolux® U680H which are unsaturated aliphatic urethane acrylates. Typically, the polymer resin will be capable of forming a thermoset polymer, though polymers other than thermoset polymers may also be suitable such as non-drying alkyd polymers. The polymer precursor may be a reactive diluent or monomer.

In addition to at least one polymer precursor or polymer resin, the clear coating composition may comprise one or more of: a defoamer (also known as an anti-foaming agent), a cross linker, a dispersant (also known as a dispersing agent), a coalescent agent and a photoinitiator. Suitable further components comprise slip or levelling agents which affect the surface tension and adhesion of the coating, adhesion promoters, wetting agents, rheological agents, light stabilisers and UV absorbers which assist in protecting against UV damage later in the life of the coating. The composition may comprise different dispersants in order to disperse the particulate perlite and to disperse the polymer precursor, e.g. polymer resin. The dispersant may be present in an amount of about 0.1 wt % to about 10 wt % based on the dry weight of perlite, for example about 1 wt % to about 7.5 wt %.

Methods for making the clear coating composition will be apparent to the skilled person. For example, a dispersant and reactive diluent (or monomer) may be combined followed by mixing with a dry milled perlite to make a high solids dispersion. The dispersion may then be combined with a suitable resin and an initiator mixed in. In alternative embodiments, the perlite may be precoated with a dispersant. Preferably, the dispersant surface coats the perlite so that effective dispersion is achieved while the coating composition is still in liquid form. The dispersant may participate in the crosslinking reaction and assist in bonding the mineral into the coating.

The polymer resin may be suitable for forming a homopolymer or a copolymer. Suitable examples comprise polyacrylates, polyesters, polyamides, polyurethanes, polyimides, polyurea, polyethers, polysilicones, fatty acid esters, as well as amine, alcohol, acid, ketone, ester, fluorinated, and aromatic functionalized versions of these polymer resins and physical blends and copolymers of the same. Polymer resins with respect to the total weight of the coating composition may be present in an amount between about 10 wt % and about 95 wt %, or between about 20 wt % to about 85 wt %, or between about 30 wt % to about 75 wt %, or between about 40 wt % to about 65 wt %, or between about 50 wt % to about 80 wt %.

Suitable defoamers include, for example, blends of surfactants, tributyl phosphate, fatty polyoxyethylene esters plus fatty alcohols, fatty acid soaps, silicone emulsions and other silicone containing compositions, waxes and inorganic particulates in mineral oil, blends of emulsified hydrocarbons and other compounds sold commercially as defoamers. Suitable coalescent agents include, for example, hydrophilic glycol ethers, for example the Dowanol® range such as Dowanol® DPM and Dowanol® DPnB, hydrophobic glycol ethers and blockcopolymers. Suitable dispersants include polyacrylates, such as the Dispex® range, hydrophilic blockcopolymer, acrylic block copolymer and non-ionic surfactants.

Perlite according to the invention comprises perlite particles. Perlite may be expanded perlite, such as expanded milled perlite, a milled perlite or mixtures thereof.

Perlite is a natural glass, also known as volcanic glass, which is formed by the rapid cooling of siliceous magma or lava. Most natural glasses are chemically equivalent to rhyolite. Natural glasses which are chemically equivalent to trachyte, dacite, andesite, latite, and basalt are known but are less common. The term "obsidian" is generally applied to dark, most often black, massive natural glasses that are rich in silica (i.e., $SiO_2$). Obsidian glasses may be classified into subcategories according to their silica content, with rhyolitic obsidians (containing typically about 73% $SiO_2$ by weight) as the most common (Berry et al., 1983).

Perlite ore is a hydrated natural glass containing typically about 72-75% $SiO_2$, 12-14% $Al_2O_3$, 0.5-2% $Fe_2O_3$, 3-5% $Na_2O$, 4-5% $K_2O$, 0.4-1.5% $CaO$ (by weight), and small concentrations of other metallic elements. Perlite ore is distinguished from other natural glasses by a higher content (2-10% by weight) of chemically bonded water, the presence of a vitreous, pearly luster, and characteristic concentric or arcuate onion skin-like (i.e., perlitic) fractures.

Perlite products may be prepared by methods disclosed herein which may include milling, screening, and thermal expansion. The perlite products can possess commercially valuable physical properties such as high porosity, low bulk density, and chemical inertness. Depending on the quality of the perlite ore and the method of processing, expanded perlite products can be used as filter aids, lightweight insulating materials, filler materials, horticultural and hydroponic media, and chemical carriers.

The processing of perlite can include comminution of the ore (crushing and grinding), screening, thermal expansion, milling, and air size separation of the expanded material to meet the specification of the finished product and other methods known in the art. For example, perlite ore is crushed, ground, and separated to a predetermined particle size range (e.g., passing 30 mesh), then the separated material is heated in air at a temperature of 870-1100° C. in an expansion furnace (cf. Neuschotz, 1947; Zoradi, 1952), where the simultaneous softening of the glass and vaporization of contained water leads to rapid expansion of glass particles to form a frothy glass material with a bulk volume up to 20 times that of the unexpanded ore. The expanded perlite is then separated to meet the size specification of the final product.

Expanded perlite includes one or more cells, or parts of cells, in which a cell is essentially a void space partially or entirely surrounded by walls of glass, usually formed from expansion of gases when the glass is in a softened state. The presence of gas-filled or vacuous cells in a given volume of glass results in lower centrifuged wet density than for the same volume of solid glass. If cells are closed and air is entrapped, the particles of perlite may float on liquid. Fracturing of perlite, for example, by milling, can create an intricate cellular structure that retains the characteristic of low wet density and also provides useful features for filtration and functional filler applications.

Following comminution, e.g. grinding, the perlite may have a $d_{50}$ in the range of about 0.5 μm to about 25 μm as measured according to the Sedigraph method or as measured by laser diffraction. In certain embodiments the perlite may have a $d_{50}$ (Sedigraph) ranging from about 0.6 µm to about 23 µm, or ranging from about 0.8 µm to about 20 µm, or ranging from about 1.0 µm to about 17 µm, or ranging from about 1.2 µm to about 15 µm, or ranging from about 1.4 µm to about 12 µm, or ranging from about 1.4 µm to about 10 µm, or ranging from about 1.6 µm to about 8 µm, or ranging from about 1.8 µm to about 6 µm, or ranging from about 2 µm to about 4 µm.

In certain embodiments, the morphology of the perlite may be characterized by the aspect ratio. The aspect ratio of a particulate refers generally to a ratio of the length-to-width of the particulate. For a given particulate sample, the aspect ratio may be determined as an average. For example, the aspect ratio of the perlite according to some embodiments may be determined by first depositing a slurry including a sample of the perlite on a standard SEM stage and coating the slurry with platinum. Images of the slurry may thereafter be obtained, and the particle dimensions may be determined, for example, using a computer-based analysis, in which it is assumed that the thickness and width of the particles are equal. The aspect ratio may then be determined by averaging a number of calculations (e.g., fifty calculations) of individual particle length-to-width aspect ratios. Other methods of determining aspect ratios are contemplated.

In certain embodiments, the perlite may have an aspect ratio of at least 2:1. For example, the perlite may have an aspect ratio of at least 5:1, an aspect ratio of at least 7:1, an aspect ratio of at least 9:1, an aspect ratio of at least 11:1, an aspect ratio of at least 13:1, or an aspect ratio of at least 15:1, an aspect ratio of at least 17:1, an aspect ratio of at least 20:1, an aspect ratio of at least 23:1, an aspect ratio of at least 26:1, an aspect ratio of at least 28:1, an aspect ratio of at least 30:1, or an aspect ratio of at least 33:1.

In certain embodiments, the perlite may have an aspect ratio of up to at least 35:1. For example, the perlite may have an aspect ratio up to at least 32:1, an aspect ratio up to at least 29:1, an aspect ratio up to at least 27:1, or an aspect ratio up to at least 22:1.

For example, a perlite with a $d_{50}$ of about 6 µm or less may have an aspect ratio of about 7:1 to about 35:1. For example, a perlite with a $d_{50}$ of about 5.5 µm or less may have an aspect ratio of about 10:1 to about 20:1.

According to some embodiments of the method, the perlite particle may have a median plate thickness of less than or equal to about 2 µm, such as, for example, less than or equal to about 1 µm. According to some embodiments, the perlite may have a median plate thickness ranging from about 0.05 µm to about 2 µm.

The median equivalent particle diameter ($d_{50}$ value) and other particle size properties referred to herein for the particulate perlite are as measured in a well-known manner by one of two methods. One method involves measurement in a well-known manner by sedimentation of the particulate material in a fully dispersed condition in an aqueous medium using a Sedigraph 5100 machine as supplied by Micromeritics Instruments Corporation, Norcross, Georgia, USA (telephone: +1 770 662 3620; web-site: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (esd), less than given esd values. The median particle size $d_{50}$ is the value determined in this way of the particle esd at which there are 50% by weight of the particles which have an equivalent spherical diameter less than that $d_{50}$ value. A further method involves measurement by laser diffraction. One laser diffraction method is wherein a fully dispersed sample in an aqueous medium is measured using a Cilas 1064 machine supplied by Quantachrome. A Cilas 1190LD may also be used in the laser diffraction method.

In certain embodiments the perlite may have a specific surface area (as measured by the BET liquid nitrogen absorption method ISO 9277) in the range of about 1 m$^2$ g$^{-1}$ to about 15 m$^2$ g$^{-1}$, about 2 m$^2$ g$^{-1}$ to about 13 m$^2$ g$^{-1}$, about 3 m$^2$ g$^{-1}$ to about 10 m$^2$ g$^{-1}$, about 4 m$^2$ g$^{-1}$ to about 8 m$^2$ g$^{-1}$, or about 5 m$^2$ g$^{-1}$ to about 6 m$^2$ g$^{-1}$.

In certain embodiments the perlite may have an oil absorption, as measured according to NF EN ISO 787-5 in the range of about 30 ml/100 g to about 250 ml/100 g, in the range of about 40 ml/100 g to about 230 ml/100 g, in the range of about 50 ml/100 g to about 200 ml/100 g, in the range of about 60 ml/100 g to about 180 ml/100 g, in the range of about 70 ml/100 g to about 160 ml/100 g, in the range of about 80 ml/100 g to about 140 ml/100 g, in the range of about 60 ml/100 g to about 120 ml/100 g, in the range of about 70 ml/100 g to about 100 ml/100 g, or in the range of about 80 ml/100 g to about 90 ml/100 g.

The clear coating compositions for use in the present invention are suitable for matt compositions and gloss compositions.

In certain embodiments the matt composition may have a gloss (60°)<90 as measured in accordance with ISO 2813. For example, the matt or the semi-gloss composition may have a gloss (60°)<80, for example <70, for example <60, for example <50, for example <40, for example <30, for example <20, for example <10, for example <5, all measured in accordance with ISO 2813. In certain embodiments, the matt composition may have a gloss (60°)>5, for example >10 as measured in accordance with ISO 2813.

In certain embodiments the gloss composition may have a gloss (20°)>5, for example >10, for example >20, for example >30, for example >40, for example >50, for example >60, for example >70, for example >80 as measured in accordance with ISO 2813.

Transparency level, $\Delta E^*_t$, is calculated according to the $\Delta E^*$ as expressed using the CIE(L*a*b*) system:

$$\Delta E^* \approx \sqrt{(L_2^* - L_1^*)^2 + (a_2^* - a_1^*)^2 + (b_2^* - b_1^*)^2}$$

which is based on colour difference between the clearcoat without filler and the clearcoat with filler, wherein $L^*_1$, $a^*_1$ and $b^*_1$ refers to the clearcoat without filler and $L^*_2$, $a^*_2$ and $b^*_2$ refers to the clearcoat with filler.

In certain embodiments $\Delta E^*_t$ is less than 15, or less than 14, or less than 13, or less than 10.

In certain embodiments matt compositions with, for example, a gloss (60°)<90 as measured in accordance with ISO 2813 exhibit a transparency level, $\Delta E^*_t$ of less than 15.

Stain resistance, $\Delta E^*_{sr}$, is calculated according to the $\Delta E^*$ as expressed using the CIE(L*a*b*) system:

$$\Delta E^* \approx \sqrt{(L_2^* - L_1^*)^2 + (a_2^* - a_1^*)^2 + (b_2^* - b_1^*)^2}$$

which is based on colour difference between the stained and unstained area, wherein $L^*_1$, $a^*_1$ and $b^*_1$ refers to the unstained area and $L^*_2$, $a^*_2$ and $b^*_2$ refers to the stained area.

In certain embodiments $\Delta E^*_{sr}$ is less than 4, or less than 3.8, or less than 3.6, or less than 3.4, or less than 3.2, or less than 3, or less than 2.8, or less than 2.6, or less than 2.4, or less than 2.2, or less than 2.0, or less than 1.8, or less than 1.5, or less than 1.

In certain embodiments, gloss compositions with a gloss (20°)>20 as measured in accordance with ISO 2813 exhibits a stain resistance $\Delta E^*_{sr}$ of less than 3.

In certain embodiments the coating composition typically comprises up to about 30 wt %, up to about 28 wt %, up to about 26 wt %, up to about 24 wt %, up to about 22 wt % up to about 20 wt %, up to about 18 wt %, up to about 16 wt %, up to about 14 wt %, up to about 12 wt %, up to about 10 wt %, or up to about 8 wt % of perlite all based on the total weight of the clear composition. The coating composition may comprise at least about 0.5 wt %, at least about 1 wt %, at least about 1.5 wt %, at least about 2 wt %, at least about 3 wt %, at least about 4 wt %, at least about 5 wt %, at least about 6 wt %, or at least about 7 wt % of the perlite based on the total weight of the clear composition.

In certain embodiments the polymer resin is present in an amount of between about 50 wt % to about 97 wt %, or between about 55 wt % to about 95 wt %, or between about 60 wt % to about 92 wt %, or between about 65 wt % to about 90 wt %, or between about 70 wt % to about 85 wt %, or between about 75 wt % to about 80 wt % based on the total weight of the clear coating composition.

Advantageously, perlite for use in the coating compositions are free or essentially free of high refractive index contaminants. Examples of such contaminants include $TiO_2$ and $Fe_2O_3$. The amount of titanium (expressed as wt % of $TiO_2$) may be less than 0.1. The amount of iron (expressed as wt % of $Fe_2O_3$) may be less than 1. The refractive index of the perlite may advantageously be matched or closely matched to that of the remainder of the clear coating composition.

The clear coating composition is suitable for application on a range of articles or substrates. Suitable substrates include wood, plastic, metal. The substrate may comprise metal and/or plastic. In certain embodiments the substrate does not comprise wood. Methods for coating the articles are known to the skilled person and include brushing and spraying.

In certain embodiments, the clear coating compositions may have one or more of the following effects:

- increased or maintained mechanical properties such as one or more of the properties: hardness (e.g. ASTM D3363 or ASTM D4366), abrasion resistance (e.g. ASTM D4060), adhesion (e.g. ISO 2409), weathering performances (QUV) (ASTM D7787) and blocking resistance (e.g. ASTM D4946);
- good transparency;
- good stain resistance;
- good matting properties;
- good aesthetic properties, such as by adjusting the gloss level
- high loading of perlite without diminishing transparency;
- high stain resistance, especially with gloss clear coating compositions;
- reduced amount of polymer resin required leading to more cost effective clear coating compositions
- good smoothness aspect of the film coating.

For the avoidance of doubt, the present application is directed to subject-matter described in the following numbered paragraphs.

1. A clear coating composition comprising a perlite, wherein the median particle size, $d_{50}$, of the perlite is in the range of 0.5 µm and 25 µm as measured by sedimentation using a Sedigraph or as measured by laser diffraction.
2. The clear coating composition according to numbered paragraph 1, wherein the BET surface area of the perlite is in the range of 1 $m^2$/g to 15 $m^2$/g.
3. The clear coating composition according to numbered paragraph 1 or numbered paragraph 2, wherein the oil absorption of the perlite is in the range of 30 ml/100 g to 250 ml/100 g as measured in accordance NF EN ISO 787-5.
4. The clear coating composition according to any one of the preceding numbered paragraphs, wherein the perlite is an expanded perlite, an expanded milled perlite, a milled perlite or mixtures thereof.
5. The clear coating composition according to any one of the preceding numbered paragraphs, wherein the aspect ratio of perlite is from about 2:1 to about 35:1, preferably from about 10:1 to about 20:1.
6. The clear coating composition according to any one of the preceding numbered paragraphs, wherein the coating composition is a matt or semi-gloss composition.
7. The clear coating composition according to numbered paragraph 6, wherein the matt or semi-gloss composition has a gloss (60°)<70 according to ISO 2813.
8. The clear coating composition according to numbered paragraphs 1 to 5, wherein the coating composition is a gloss composition.
9. The clear coating composition according to numbered paragraph 8, wherein the gloss composition has a gloss (60°)>80 according to ISO 2813.
10. The clear coating composition according to any one of the preceding numbered paragraphs, wherein the composition has a transparency level, $\Delta E^*_t$, of less than 15, wherein $\Delta E^*_t$ is the $\Delta E^*$ between a coating without filler and a coating with filler.
11. The clear coating composition according to any one of the preceding numbered paragraphs, wherein the composition has a stain resistance, $\Delta E^*_{sr}$, of less than 4, wherein $\Delta E^*_{sr}$ is the $\Delta E^*$ between an unstained area and a stained area.
12. The clear coating composition according to any one of the preceding numbered paragraphs, wherein the perlite is present in an amount of 0.5 to 30% by weight based on the total weight of the clear coating composition.
13. The clear coating composition according to any one of the preceding numbered paragraphs, further comprising one or more of a polymer resin, a defoamer, a cross-linker, a dispersant, a coalescent agent, an adhesion promoter, a wetting agent, a rheological agent, a light stabiliser and/or a UV absorber.
14. The clear coating composition according to numbered paragraph 13, wherein the polymer resin is present in an amount between about 50 wt % to about 97 wt %, by weight based on the total weight of the clear coating composition.
15. A method of making clear coating composition according to any one of the preceding numbered paragraphs comprising blending the perlite and other components of the clear coating composition.
16. The method of making clear coating compositions according to numbered paragraph 15, wherein the other components comprise one or more of a polymer resin, a defoamer, a cross-linker, a dispersant, a coalescent agent, an adhesion promoter, a wetting agent, a rheological agent, a light stabiliser and/or a UV absorber.

17. Use of a clear coating composition according to any one of numbered paragraphs 1 to 14 for coating an article or substrate.

18. The use according to numbered paragraph 17, wherein the substrate is selected from wood, plastic, metal and combinations thereof.

19. The use according to numbered paragraph 17 or numbered paragraph 18, wherein the substrate is selected from plastic, metal and combinations thereof.

20. A method for coating an article or substrate comprising coating said article or substrate with the clear coating composition according to any one of numbered paragraphs 1 to 14.

21. A method according to numbered paragraph 20, wherein the coating is cured after coating article or substrate.

22. A method according to numbered paragraph 20 or numbered paragraph 21, wherein the substrate is selected from wood, plastic, metal and combinations thereof.

23. A method according numbered paragraphs 20 to 22, wherein the substrate is selected from plastic, metal and combinations thereof.

24. An article or substrate coated with a clear coating composition according to any one of numbered paragraphs 1 to 14.

EXAMPLES

Example 1: Gloss Clear Coating Compositions

A number of gloss clear coating compositions were formulated using the minerals shown in Table 1. Examples C and D represent the expanded milled perlite according to invention, and examples A and B represent nepheline syenite, a silica deficient sodium-potassium alumina silicate. The minerals of Table 1 were used in the formulations shown in Table 2.

TABLE 1

Inorganic particulate minerals

| Product specifications | A | B | C | D |
|---|---|---|---|---|
| $D_{50}$ (μm)[1] | 6.3 | 3.7 | 5.1 | 2.6 |
| Oil Absorption (ml/100 g) | 23 | 31 | 47 | 50 |
| BET (m$^2$/g) | 4 | 4.5 | 2.9 | 1.9 |

[1] As measured by laser diffraction.

TABLE 2

Gloss formulations of clear coating compositions

| Raw material | Function | % Weight Formulation No. | | | | | | |
|---|---|---|---|---|---|---|---|---|
| | | 1 | 2 | 3 | 4 | 5 | 6 | 7 |
| Alberdingk AC 25381 ® | Polymer resin | 74.5 | 74.5 | 74.5 | 74.5 | 74.5 | 74.5 | 74.5 |
| Tego Foamex 822 ® | defoamer | 0.4 | 0.4 | 0.4 | 0.4 | 0.4 | 0.4 | 0.4 |
| Dowanol DPM ® | Coalescent agent | 5.0 | 5.0 | 5.0 | 5.0 | 5.0 | 5.0 | 5.0 |
| Dowanol DPnB ® | Coalescent agent | 2.0 | 2.0 | 2.0 | 2.0 | 2.0 | 2.0 | 2.0 |
| Water | Solvent | 15.6 | 13.6 | 13.6 | 15.6 | 13.6 | 15.6 | 13.6 |
| A | Filler | 1.0 | 3.0 | | | | | |
| B | Filler | | | 3.0 | | | | |
| C | Filler | | | | 1.0 | 3.0 | | |
| D | Filler | | | | | | 1.0 | 3.0 |
| Byk 346 ® | Wetting agent | 0.3 | 0.3 | 0.3 | 0.3 | 0.3 | 0.3 | 0.3 |
| Rheovis PU 1214 ® | Rheological agent | 0.3 | 0.3 | 0.3 | 0.3 | 0.3 | 0.3 | 0.3 |
| Tego Foamex 822 ® | defoamer | 0.2 | 0.2 | 0.2 | 0.2 | 0.2 | 0.2 | 0.2 |
| Dispex AA 4030 ® | Dipersant | 0.7 | 0.7 | 0.7 | 0.7 | 0.7 | 0.7 | 0.7 |
| Total | | 100.0 | 100.0 | 100.0 | 100.0 | 100.0 | 100.0 | 100.0 |

The formulations according to Table 2 were prepared by stirring the polymer resin and defoamer (0.4%) for 3 min at 1800 tr/min. The filler was then added and stirred for 20 min at 2100 tr/min. Once the filler was dispersed the remaining defoamer (0.2%) was added followed by stirring at 3 min at 1800 tr/min. To the mixture was then added the wetting agent, water, rheological agent and finally the premix (i.e. a hand blended mixture two coalescent agents and water in a ratio of 1:1) and stirred for 10 min at 1000 tr/min. The resulting formulation was then degazed to form the clear coat.

The stain resistance of samples 2, 3, 5 and 7 were then tested as follows.

Stain Resistance:

The stain resistance is determined according to ASTM D1308. In an unsealed plain white chart, the clear coat composition was applied at a wet thickness of 100 μm. After allowing the clear coat to dry for 24 hr, 0.5 ml of a staining material was applied to the surface. The staining materials used are ethanol, water, coffee and wine, which are tested on different portions of the same chart. A section of the chart is left unstained. A watch glass was then placed on top of the sample for 24 hr after which time the dry stains were removed from the surface with a soft towel.

The stain resistance, $\Delta E^*_{sr}$, is calculated from the $\Delta E^*$, which was evaluated after cleaning the varnished surface. $\Delta E^*$ is expressed using the CIE(L*a*b*) system:

$$\Delta E^* \approx \sqrt{(L_2^* - L_1^*)^2 + (a_2^* - a_1^*)^2 + (b_2^* - b_1^*)^2}$$

which is based on colour difference between the stained and unstained area, wherein $L^*_1$, $a^*_1$ and $b^*_1$ refers to the unstained area and $L^*_2$, $a^*_2$ and $b^*_2$ refers to the stained area. The average value $\Delta E^*$ of all stains is measured with a Spectro-guide, BYK Gardner spectrocolorimeter. The $\Delta E^*_{sr}$ is shown in Table 3.

TABLE 3

Stain Resistance

| Formulation No. | $\Delta E^*_{sr}$ | % diff. $\Delta E^*_{sr}$[1] |
|---|---|---|
| 5 | 2.7 | +12% |
| 7 | 2.4 | — |
| 2 | 4.3 | +79% |
| 3 | 3.9 | +62.5% |

[1]In comparison to the best performing composition of formula No. 7

As may be seen from Table 3, the $\Delta E^*_{sr}$ for the inventive examples (i.e formulation no. 5 and 7) is much lower than for the comparative examples (i.e formulation no. 2 and 3). This is not only demonstrated by the absolute value of $\Delta E^*_{sr}$, but also the % difference in $\Delta E^*_{sr}$ in comparison to the best performing composition of formulation 7.

Therefore the perlite clear coating compositions of the present invention are more stain resistant than known nepheline syenite based clear coating compositions.

Formulation no. 5 and 7 of the invention were also found to have similar optical properties to the comparative examples, formulation no. 2 and 3, in terms of transparency properties. This was observed at a number of mineral loadings, such as, 1% and 3%, and a range of wet film thicknesses, such as 60 μm, 120 μm and 400 μm.

Example 2: Matt or Semi-Gloss Clear Coating Compositions

The mineral used in the formulation of the matt or semi-gloss clear coating compositions can be found in Table 4. Examples C, D and E represent the expanded milled perlite according to invention, and examples F and G represent synthetic silica. The minerals of Table 4 were used in the formulations shown in Table 5.

TABLE 4

Inorganic particulate minerals

| Product specifications | F | G | C | D | E |
|---|---|---|---|---|---|
| $D_{50}$ (μm)[1] | 6.3 | 6.5 | 5.1 | 2.6 | 10.1 |
| Oil Absorption (ml/100 g) | 240 | 295 | 47 | 50 | 67 |
| BET (m²/g) | 130 | 220 | 2.9 | 1.9 | 1.6 |

[1]As measured by laser diffraction.

TABLE 5

Matt or semi-gloss formulations of clear coating compositions

| | | % Weight Formulation No. | | | | | |
|---|---|---|---|---|---|---|---|
| Raw material | Function | 8 | 9 | 10 | 11 | 12 | 13 |
| Alberdingk AC 25381 ® | Polymer resin | 74.5 | 74.5 | 74.5 | 74.5 | 74.5 | 74.5 |
| Tego Foamex 822 ® | Defoamer | 0.4 | 0.4 | 0.4 | 0.4 | 0.4 | 0.4 |
| Dowanol DPM ® | Coalescent agent | 5.0 | 5.0 | 5.0 | 5.0 | 5.0 | 5.0 |
| Dowanol DPnB ® | Coalescent agent | 2.0 | 2.0 | 2.0 | 2.0 | 2.0 | 2.0 |
| Water | Solvent | 15.0 | 14.6 | 9.6 | 8.2 | 11.6 | 17.3 |
| F | Filler | 1.6 | | | | | |
| G | Filler | | 2.0 | | | | |
| C | Filler | | | 7.0 | | | |
| D | Filler | | | | 8.4 | | |
| E | Filler | | | | | 5.0 | |
| Byk 346 ® | Wetting agent | 0.3 | 0.3 | 0.3 | 0.3 | 0.3 | 0.3 |
| Rheovis PU 1214 ® | Rheological agent | 0.3 | 0.3 | 0.3 | 0.3 | 0.3 | 0.3 |
| Tego Foamex 822 ® | Defoamer | 0.2 | 0.2 | 0.2 | 0.2 | 0.2 | 0.2 |
| Dispex AA 4030 ® | Dispersant | 0.7 | 0.7 | 0.7 | 0.7 | 0.7 | 0.7 |
| Total | | 100.0 | 100.0 | 100.0 | 100.0 | 100.0 | 100.0 |

The formulations of Table 5 were prepared according to the same procedure used for the formulations of Table 2.

Transparency

The formulations of Table 5 have varying amounts of mineral, which was found to be the amount required to achieve a gloss (60°)=30 according to ISO 2813.

On a sealed black chart, a clear coating composition of Table 5 was applied at a wet thickness of 120 μm clear coat and dried for 24 h. The colour was then measured according to the CIE (L* a* b*) system by reflexion using SCE (Specular Component Excluded) mode with a spectrophotometer (Konica Minolta 3700 d, illuminant D65/10°).

The $\Delta E^*$ for the composition according to Table 5 was then compared with the $\Delta E^*$ of a comparable composition without filler (formula 13) to provide the $\Delta E^*_r$. $\Delta E^*$ is expressed using the CIE(L*a*b*) system:

$$\Delta E^* \approx \sqrt{(L^*_2 - L^*_1)^2 + (a^*_2 - a^*_1)^2 + (b^*_2 - b^*_1)^2}$$

which is based on colour difference between the clearcoat without filler and the clearcoat with filler, wherein $L^*_1$, $a^*_1$ and $b^*_1$ refers to the clearcoat without filler and $L^*_2$, $a^*_2$ and $b^*_2$ refers to the clearcoat with filler.

TABLE 6

Transparency
Gloss (60°) = 30

| Formulation No. | $\Delta E^*_t$ | diff. $\Delta E^*_t{}^1$ |
|---|---|---|
| 8 | 15.0 | 2.0 |
| 9 | 14.3 | 1.1 |
| 10 | 13.4 | 0.2 |
| 11 | 14.0 | 0.8 |
| 12 | 13.2 | — |

[1]In comparison to the best performing composition of formula No. 12

Transparency refers to how clear the coating is by limiting the hazy aspect. The transparency method is not depend on the distance of the measurement from the film/object.

Compositions according to the invention, according to formulation no. 10 to 12, were found to have a better transparency than the comparative compositions according to formulation no. 8 and 9.

Similar transparency results were obtained with a wet film thickness of 60 μm and 400 μm. The clear coating compositions with a gloss (60°)=47 were also found to perform well in the transparency test.

Amount of Polymer Resin Required in the Clear Coating Composition

The following formulations were prepared using the method to prepare the formulation of Table 2. Both formulations of Table 7 have a gloss (60°)=30.

TABLE 7

Volumic measurements

| | | % weight Formulation No. | | grams Formulation No. | |
|---|---|---|---|---|---|
| Raw material | Function | 14 | 15 | 14 | 15 |
| Alberdingk AC 25381 ® | Polymer resin | 74.5 | 74.5 | 74.5 | 74.5 |
| Tego Foamex 822 ® | defoamer | 0.4 | 0.4 | 0.4 | 0.4 |
| Dowanol DPM ® | Coalescent agent | 5.0 | 5.0 | 5.0 | 5.0 |
| Dowanol DPnB ® | Coalescent agent | 2.0 | 2.0 | 2.0 | 2.0 |
| Water | Solvent | 15.0 | 9.6 | 15.0 | 8.6 |
| F | Filler | 1.6 | | 1.6 | |
| C | Filler | | 7.0 | | 6.6 |
| Byk 346 ® | Wetting agent | 0.3 | 0.3 | 0.3 | 0.3 |
| Rheovis PU 1214 ® | Rheological agent | 0.3 | 0.3 | 0.3 | 0.3 |
| Tego Foamex 822 ® | defoamer | 0.2 | 0.2 | 0.2 | 0.2 |
| Dispex AA 4030 ® | dispersant | 0.7 | 0.7 | 0.7 | 0.7 |
| Total | | 100.0 | 100.0 | 100.0 | 94.3 |
| Volumetric percentage of dry components | | 38.3 | 42.6 | 38.3 | 42.6 |

The same weight percentage of polymer resin was used in both formulations. However, to obtain the same gloss level, more filler is required in the formulation according to the invention (formula 15) than with the comparative formulation (formula 14). This means that less resin is required for the inventive example formula 15, than for the comparative example, formula 14, i.e. 70.2 g and 74.5 g, respectively. The reduced amount of polymer resin of the formulation according to the invention leads to more cost effective clear coating compositions.

Example 3: Commercial Gloss Polyurethane Clear Coat

The minerals were also evaluated when added to gloss polyurethane clear coats. The mineral according to Example H in Table 8 represents the expanded milled perlite according to the invention.

TABLE 8

| Inorganic Particulate Minerals | |
|---|---|
| Product Specifications | H |
| $D_{50}$ (μm)[1] | 6.0 |
| Oil Absorption (mL/100 g) | 58 |
| BET (m²/g) | 2.9 |

[1]As measured by laser diffraction.

Example H according to the invention and synthetic silica according to example F were formulated with a commercially procured clear coat with a polyurethane resin system, Minwax® Water Based Oil Modified Polyurethane. Formulations were prepared according to Table 9.

TABLE 9

Polyurethane Clear Coating Compositions

| | | % Weight Formulation No. | | |
|---|---|---|---|---|
| Raw material | Function | 16 | 17 | 18 |
| Gloss Clear Coat | Clear Coat | 100 | 94 | 99 |
| H | Filler | — | 6 | — |
| F | Filler | — | — | 1 |
| Total | | 100.0 | 100.0 | 100.0 |

The formulations were prepared by adding the filler to the commercial clear coat solution and stirring for 10 minutes at 1000 rpm. The resulting solution was then degassed to form a clear coat for analysis.

Transparency & Gloss

The formulation according to formulation no. 16 has no filler and high gloss. The remaining formulations of Table 5 have varying amounts of mineral, which in each case was found to be the amount required to achieve a gloss (60°)=30 according to ISO 2813.

Following the procedure as described in Example 2, transparency of the samples, represented by $\Delta E^*$, was measured and compared to formulation 16 as a reference containing no filler. Gloss (20°) was measured in accordance with ISO 2813. The results are shown in Table 10.

TABLE 10

Transparency & Gloss (20°)
Gloss (60°) = 30

| Formulation No. | $\Delta E^*_t$ | Gloss (20°) |
|---|---|---|
| 16 | — | 88.2 |
| 17 | 14.91 | 7 |
| 18 | 14.03 | 7 |

Formulations 17 and 18 were found to have similar transparency to one another, as measured by $\Delta E^*$. Both formulations 17 and 18 have much higher filler levels than the reference sample of formulation 16, which contains no filler. The amount of filler in formulation 17 is higher than for formulation 18, at 6 weight % and 1 weight %, respectively.

In comparison to formulation 16, which exhibited a high gloss of gloss (20°)=88.2, formulations 17 and 18 were both found to have gloss (20°)=7 at a dry film thickness of 30 μm over a sealed white chart dried for 24 hours. This shows that the addition of filler reduces the gloss (20°) of the polyurethane clear coat. A clear coating composition with a gloss (60°)=50 was also found to perform well in these tests.

The results show that even when using much higher loading levels of filler, as is the case in the formulation 17 according to the invention, good transparency is achieved. This leads to more cost effective formulations with maintained performance being obtained.

The invention claimed is:

1. A clear coating composition comprising a thermoset polymer and a perlite, wherein:
the median particle size, $d_{50}$, of the perlite is in the range of 17 μm and 25 μm as measured by sedimentation using a Sedigraph or as measured by laser diffraction;
the perlite has a BET surface area in the range of 1 m²/g to 8 m²/g;
the thermoset polymer comprises any one of: a self-crosslinking aliphatic copolymer dispersion based on a polyester, a polyurethane, a polyacrylate, and a urethane acrylate; and
the oil absorption of the perlite is in the range of 30 ml/100 g to 50 ml/100 g as measured in accordance NF EN ISO 787-5.

2. The clear coating composition according to claim 1, wherein the perlite is an expanded perlite, an expanded milled perlite, a milled perlite or mixtures thereof.

3. The clear coating composition according to claim 1, wherein the coating composition is a matt or semi-gloss composition having a gloss (60°)<70 according to ISO 2813.

4. The clear coating composition according to claim 1, wherein the coating composition is a gloss composition having a gloss (60°)>80 according to ISO 2813.

5. The clear coating composition according to claim 1, wherein the composition has a transparency level, $\Delta E^*_t$, of less than 15, wherein $\Delta E^*_t$ is the $\Delta E^*$ between a coating without filler and a coating with filler and wherein between 1 to 5 wt % of filler is employed.

6. The clear coating composition according to claim 1, wherein the composition has a stain resistance, $\Delta E^*_{sr}$, of less than 4, wherein $\Delta E^*_{sr}$ is the $\Delta E^*$ between an unstained area and a stained area and wherein the stain resistance is determined according to ASTM D1308.

7. The clear coating composition according to claim 1, wherein the perlite is present in an amount of 0.5 to 30% by weight based on the total weight of the clear coating composition.

8. The clear coating composition according to claim 1, further comprising one or more of a polymer resin, a defoamer, a cross-linker, a dispersant, a coalescent agent, an adhesion promoter, a wetting agent, a rheological agent, a light stabiliser and/or a UV absorber.

9. The clear coating composition according to claim 8, wherein the polymer resin is present in an amount between about 50 wt % to about 97 wt %, by weight based on the total weight of the clear coating composition.

10. A method of making the clear coating composition according to claim 1 comprising blending the perlite and other components of the clear coating composition.

11. An article or substrate coated with the clear coating composition according to claim 1.

12. A method for coating an article or substrate, the method comprising coating said article or substrate with the clear coating composition according to claim 1.

* * * * *